(12) United States Patent
Koehler et al.

(10) Patent No.: US 7,519,510 B2
(45) Date of Patent: Apr. 14, 2009

(54) DERIVATIVE PERFORMANCE COUNTER MECHANISM

(75) Inventors: Brian Lee Koehler, Rochester, MN (US); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 10/992,444

(22) Filed: Nov. 18, 2004

(65) Prior Publication Data

US 2006/0212263 A1 Sep. 21, 2006

(51) Int. Cl.
  *G06F 11/30* (2006.01)
  *G06F 15/00* (2006.01)
  *G21C 17/00* (2006.01)
(52) U.S. Cl. ............ 702/186; 702/189; 702/198; 700/32; 700/90; 714/47; 714/699; 716/4
(58) Field of Classification Search ............ 702/182, 702/183, 189, 198, 186; 700/32, 90; 714/47, 714/699; 716/4
See application file for complete search history.

(56) References Cited

U.S. PATENT DOCUMENTS

| 5,537,541 | A  | * | 7/1996  | Wibecan  | 714/45  |
| 5,937,437 | A  | * | 8/1999  | Roth et al. | 711/202 |
| 6,275,782 | B1 | * | 8/2001  | Mann     | 702/182 |
| 7,129,675 | B2 | * | 10/2006 | Brecht   | 320/137 |
| 7,225,105 | B2 | * | 5/2007  | Mericas  | 702/182 |

OTHER PUBLICATIONS

Mindlin et al., 'Obtaining Hardware Performance Metrics for the BlueGene/L Supercomputer', IBM Research Publication pp. 1-10.*

* cited by examiner

*Primary Examiner*—Edward Raymond
*Assistant Examiner*—Elias Desta
(74) *Attorney, Agent, or Firm*—Dillon & Yudell LLP (57) ABSTRACT

A circuit and method for using hardware to calculate a first derivative of the number of performance events that occur in a microprocessor during a predetermined period of time. This first derivative indicates a frequency of such performance events, which can be used as either a predictor of future problems or needs, or may be used to invoke a corrective action.

19 Claims, 11 Drawing Sheets

DERIVATIVE PERFORMANCE COUNTER MECHANISM

BACKGROUND OF THE INVENTION

1. Technical Field

This invention relates to performance monitoring within a microprocessor, and more particularly to monitoring changes in measured performance parameters. Still more particularly, the present invention relates to a hardware mechanism that measures a rate of change in measured performance events.

2. Description of the Related Art

A benchmark is a test of computer hardware and/or software that evaluates the performance of the computer. Performance signals (measurements) are received, and then compared with baseline figures. For example, if a computer's system bus is designed to have a bandwidth of 20 MB/second, the actual maximum traffic on the system bus is measured and compared to the "benchmark" of 20 MB/second. If the system bus does not perform at the specification level, then steps are taken to determine why not.

Performance signals reflecting the activity of a tested component in the computer system are sent to a Performance Monitor Unit (PMU), which is typically part of a microprocessor being tested. The PMU contains one or more hardware Performance Monitor Counters (PMCs) that accumulate the performance signals. Besides monitoring bus speed as described above, the PMU may monitor and the PMCs may count processor cycles, instructions completed, delay cycles executing a load from memory, Input/Output (I/O) bandwidth, and any other hardware performance features of the microprocessor.

PMU/PMCs can be directly accessed using hardware probes. However, since these hardware probes are very expensive, the contents of the PMU/PMCs are usually accessed via a software interface, such as IBM's Performance Monitor Application Programming Interface (PMAPI), which is a library of APIs that provide access to PMU/PMCs in the microprocessor. A crucial problem with such software interfaces is that, by their software nature, they are not as fast as hardware probes. That is, the software interface might have to take a performance signal off a bus, load the signal into a register, perform a comparison arithmetic function, output the comparison results, etc. Such steps take many clock cycles, after which a transient error may have passed and thus is unavailable for evaluation. Adding additional software layers to attempt to capture the intermittent glitches and/or drops in performance are likely not to be possible without distorting the hardware's original behavior as well as the glitches themselves.

It is often useful to determine if a change in performance signal frequency occurs. For example, when measuring the bandwidth of the system bus described above, consider a situation in which the bandwidth experiences an intermittent drop. Polling software could be written to poll the appropriate PMC at pre-determined periods via an API, and to issue an alert when the intermittent drop is detected. However, this additional layer of polling software would likely affect the benchmark flow, since execution of the polling software would require the use of additional resources of the computer system. Furthermore, it may not be possible to poll the PMC frequently enough to achieve the required granularity needed to capture such transient events.

Therefore, there is a need for a method and system for detecting a change in hardware performance without using additional software. Preferably, the system would include means for generating an action signal responsive to the detected change in hardware performance.

SUMMARY OF THE INVENTION

As will be seen, the foregoing invention satisfies the foregoing needs and accomplishes additional objectives. Briefly described, the present invention provides an improved method and system for determining a change in performance criteria measured and stored in Performance Measurement Counters (PMCs).

According to one aspect of the present invention, a hardware comparator calculates a first derivative of the number of performance events that occur during a predetermined period of time. This first derivative indicates a frequency of such performance events, which can be used as either a predictor of future problems or needs, or may be used to invoke a corrective action.

According to another aspect of an alternate embodiment of the present invention, a second derivative of the number of performance events is also calculated by hardware, in order to predict a future need or problem as well as to invoke corrective steps.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Referring now to the drawing figures, in which like numerals indicate like elements or steps throughout the several views, the preferred embodiment of the present invention will be described. In general, the present invention provides for a circuit and method that uses first and second derivatives of performance event counts to capture an intermittent glitch in a computer system's performance.

Figure 1:
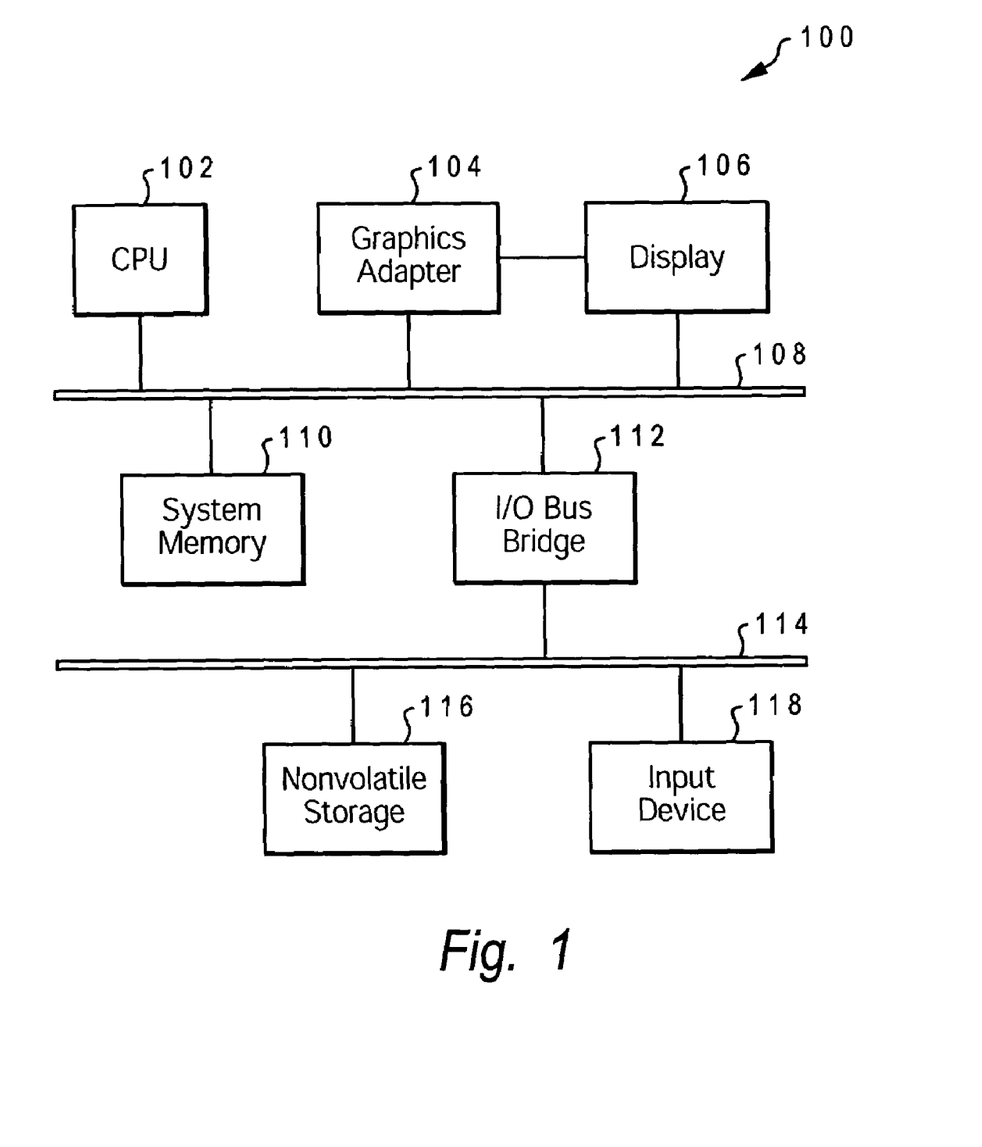
FIG. 1 is a block diagram of an exemplary computer system used in the present invention.

With reference now to FIG. 1, there is depicted a block diagram of a data processing system in which a preferred embodiment of the present invention may be implemented. Data processing system 100 may be, for example, one of the models of personal computers or servers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention.

Figure 2:
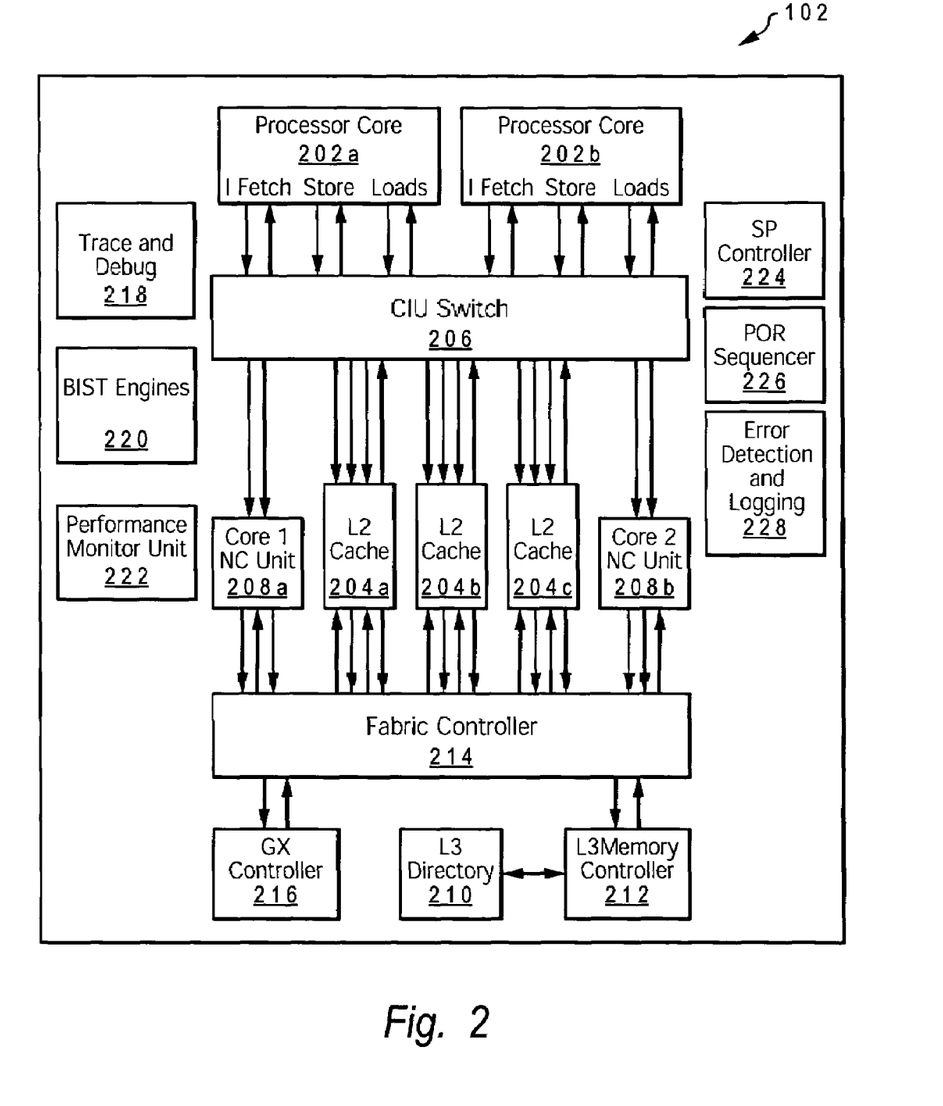
FIG. 2 depicts an exemplary processor in the exemplary computer system of FIG. 1.

The CPU 102 described in FIG. 1 is preferably a microprocessor. With reference now to FIG. 2, such an exemplary microprocessor is depicted as CPU 102. In the preferred embodiment, at least two processor cores 202a and 202b are included in CPU 102. Processor cores 202 share a unified second-level cache system depicted as L2 caches 204a-204c, through a Core Interface Unit (CIU) switch 206. CIU switch 206 is a crossbar switch between the L2 caches 204a-204c, each implemented as a separate, autonomous cache system, and the two CPU's 202. Each L2 cache 204 can operate concurrently and feed multiple bytes of data per cycle. CIU switch 206 connects each of the three L2 caches 204 to either an L1 data cache (shown as D-cache 312 below in FIG. 3) or an L1 instruction cache (shown as I-cache 320 in FIG. 3) in either of the two CPU's 102. Additionally, CIU switch 206 accepts stores from processor cores 202 across multiple-byte-wide buses and sequences them to the L2 caches 204. Each CPU 102 has associated with it a non-cacheable (NC) unit 208, responsible for handling instruction-serializing functions and performing any non-cacheable operations in the storage hierarchy. Logically, NC unit 208 is part of L2 cache 204.

An L3 directory 210 for a third-level cache L3 (not shown), and an associated L3 memory controller 212 are also part of CPU 102. The actual L3 may be onboard CPU 102 or on a separate chip. A separate functional unit, referred to as a fabric controller 214, is responsible for controlling dataflow between the L2 cache, including L2 cache 204 and NC unit 208, and L3 controller 212. Fabric controller 214 also controls input/output (I/O) dataflow to other CPUs 102 and other I/O devices (not shown). For example, a GX controller 216 can control a flow of information into and out of CPU 102, either through a connection to another CPU 102 or to an I/O device.

Also included within CPU 102 are functions logically called pervasive functions. These include a trace and debug facility 218 used for first-failure data capture, a built-in self-test (BIST) engine 220, a performance-monitoring unit (PMU) 222, a service processor (SP) controller 224 used to interface with a service processor (not shown) to control the overall data processing system 100 shown in FIG. 1, a power-on reset (POR) sequencer 226 for sequencing logic, and an error detection and logging circuitry 228.

Figure 3:
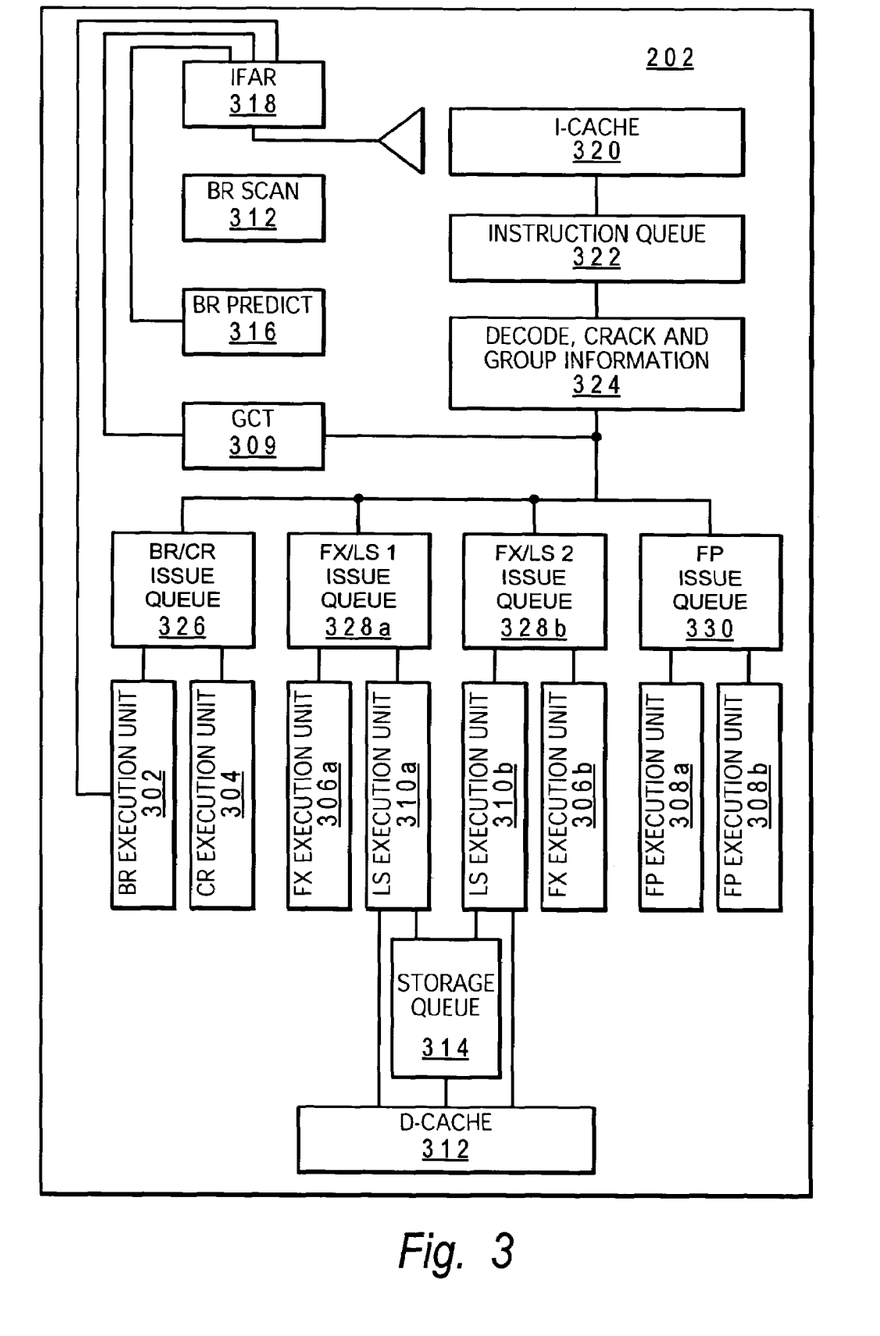
FIG. 3 illustrates an exemplary processor core in the exemplary processor of claim 2.

With reference now to FIG. 3, there is depicted a high-level block diagram of one of processor cores 202 depicted in FIG. 2. The two processor cores 202 shown in FIG. 2 are on a single chip and are identical, providing a two-way Symmetric Multiprocessing (SMP) model to software. Under the SMP model, either idle processor core 202 can be assigned any task.

The internal microarchitecture of processor core 202 is preferably a speculative superscalar out-of-order execution design. In the exemplary configuration depicted in FIG. 3, multiple instructions can be issued each cycle, with one instruction being executed each cycle in each of a BRanch (BR) execution unit 302, a Condition Register (CR) execution unit 304 for executing CR modifying instructions, FiXed point (FX) execution units 306a and 306b for executing fixed-point instructions, Load-Store execution Units (LSU) 310a and 310b for executing load and store instructions, and Floating-Point (FP) execution units 308a and 308b for executing floating-point instructions. LSU's 310, each capable of performing address-generation arithmetic, work with Data-cache (D-cache) 312 and storage queue 314 to provide data to FP execution units 308.

Global Completion Table (GCT) 309 is a table representing a group of instructions currently being processed by processor core 202. GCT 309 preferably stores the instruction, the logical program order of each instruction, and the completion order of each instruction in the group. For example, a group of three instructions stored in GCT 309 may contain data shown below in Table I.

TABLE I

| Program order | Instruction | Completion order |
|---|---|---|
| 1 | ADD R1, mem | 2 |
| 2 | ADD R2, R1 | 3 |
| 3 | LOAD R3, A | 1 |

Thus, the third program instruction (LOAD the contents of "A" into register R3) was the first to complete. The first program instruction (ADD the contents of memory location "mem" into register R1) was the second to complete, and the second program instruction (ADD the contents of register R1 into register R2 after the contents of R1 have been updated by the first program instruction) was the last to complete.

Upon certain catastrophic events, such as an instruction cache miss, an instruction branch misprediction, or a global flush of all queues and registers, including queues 326, 328 and 330, GCT 309 is emptied (flushed). Such a GCT 309 flush reflects a state of processor 202 in which execution processing must be restarted by reloading the appropriate queues to feed the execution units.

A branch-prediction scan logic (BR scan) 312 scans fetched instructions located in Instruction-cache (I-cache) 320, looking for multiple branches each cycle. Depending upon the branch type found, a branch-prediction mechanism denoted as BR predict 316 is engaged to help predict the branch direction or the target address of the branch or both.

That is, for conditional branches, the branch direction is predicted, and for unconditional branches, the target address is predicted. Branch instructions flow through an Instruction-Register Fetch Address Register (IFAR) 318, and I-cache 320, an instruction queue 322, a Decode, Crack and Group (DCG) unit 324 and a BRanch/Condition Register (BR/CR) issue queue 326 until the branch instruction ultimately reaches and is executed in BR execution unit 302, where actual outcomes of the branches are determined. At that point, if the predictions were found to be correct, the branch instructions are simply completed like all other instructions. If a prediction is found to be incorrect, the instruction-fetch logic, including BR scan 312 and BR predict 316, causes the mispredicted instructions to be discarded and begins refetching instructions along the corrected path. Such an instruction branch misprediction also causes instructions shown in GCT 309 to be flushed out.

Instructions are fetched from I-cache 320 on the basis of the contents of IFAR 318. IFAR 318 is normally loaded with an address determined by the branch-prediction logic described above. For cases in which the branch-prediction logic is in error, the branch-execution unit will cause IFAR 318 to be loaded with the corrected address of the instruction stream to be fetched. Additionally, there are other factors that can cause a redirection of the instruction stream, some based on internal events, others on interrupts from external events. In any case, once IFAR 318 is loaded, then I-cache 320 is accessed and retrieves multiple instructions per cycle. The I-cache 320 is accessed using an I-cache DIRectory (IDIR) (not shown), which is indexed by the effective address of the instruction to provide required real addresses. On an I-cache 320 cache miss, instructions are returned from the L2 cache 204 illustrated in FIG. 2. In addition, an I-cache 320 cache miss will result in the flushing of GCT 309, in order to allow another group of instructions to load into the GCT 309 and the appropriate instruction queues.

When the instruction pipeline is ready to accept instructions, the IFAR 318 content is sent to I-cache 320, IDIR, and branch-prediction logic. IFAR 318 is updated with the address of the first instruction in the next sequential sector. In the next cycle, instructions are received from I-cache 320 and forwarded to instruction queue 322 from which DCG unit 324 pulls instructions and sends them to the appropriate instruction issue queue, either BR/CR issue queue 326, FiXed-point/Load-Store (FX/LS) issue queues 328a-328b, or Floating-Point (FP) issue queue 330.

As instructions are executed out of order, it is necessary to remember the program order of all instructions in flight. To minimize the logic necessary to track a large number of in-flight instructions, groups of instructions are formed. The individual groups are tracked through the system. That is, the state of the machine is preserved at group boundaries, not at an instruction boundary within a group. Any exception causes the machine to be restored to the state of the oldest group prior to the exception.

A group contains multiple internal instructions referred to as Instruction OPerations (IOPs). In a preferred embodiment, in the decode stages, the instructions are placed sequentially in a group—the oldest instruction is placed in slot 0, the next oldest one in slot 1, and so on. Slot 4 is reserved solely for branch instructions. If required, no-ops are inserted to force the branch instruction to be in the fourth slot. If there is no branch instruction, slot 4 contains a no-op. Only one group of instructions is dispatched, i.e., moved into an issue queue, in a cycle, and all instructions in a group are dispatched together. Groups are dispatched in program order. Individual IOPs are issued from the issue queues to the execution units out of program order.

Results are committed, i.e., released to downstream logic, when the group completes. A group can complete when all older groups have completed and when all instructions in the group have finished execution. Only one group can complete in a cycle.

Figure 4A:
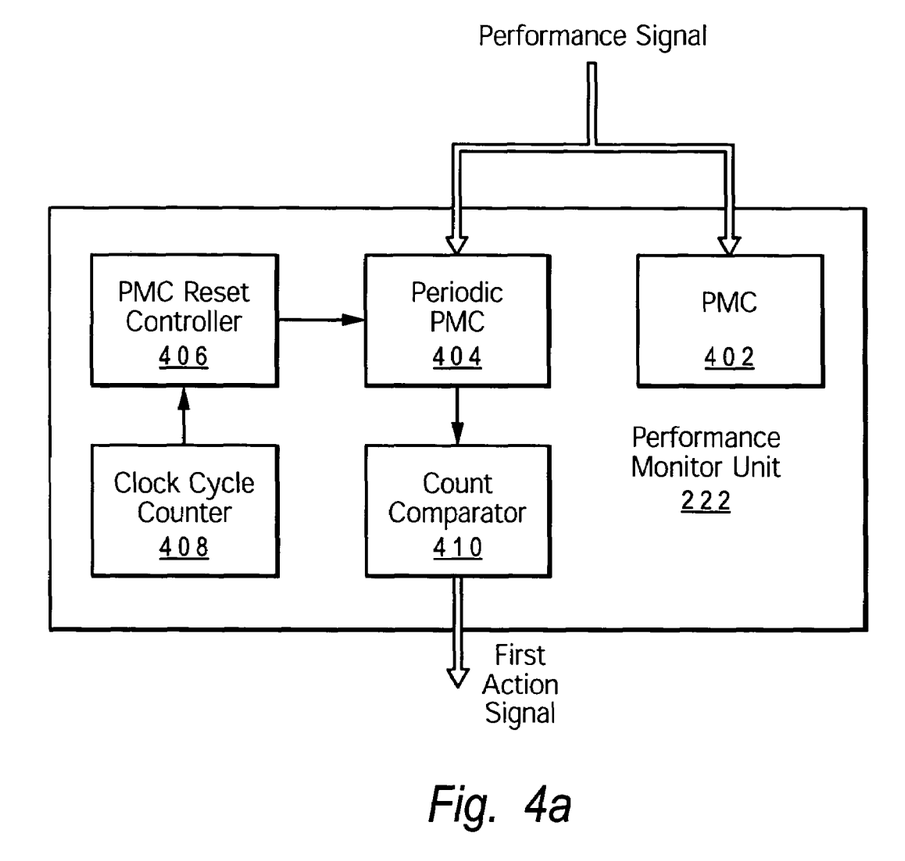
FIG. 4a is a schematic diagram illustrating a Performance Monitor Unit (PMU) using a periodic Performance Monitor Counter (PMC) and a count comparator to calculate a first derivative that quantifies a rate of change in system performance signals.

With reference now to FIG. 4a, there is depicted in a simplified block diagram additional detail of a preferred embodiment of PMU 222. PMU 222 includes a performance monitor counter 224, which counts performance events, such as data flow across a bus (including I/O bus 114 shown in FIG. 1); the number of reads or writes to nonvolatile storage 116, system memory 110, L1 cache (e.g., D-cache 312 or I-cache 320), L2 cache 204, or L3 cache; the number of reads or writes that are aborted; the number of cache misses occurring at any cache level (L1, L2 or L3); the number of clock cycles over a threshold required for a read or write operation; the number of clock cycles that any selected component in FIGS. 1-3 are idle; and any other hardware activity known to those skilled in the art as being capable of being monitored by a PMU. In particular, PMU 222, in any of the embodiments described in the present specification, can be used to monitor any of the hardware components described in FIGS. 1-3, plus any other hardware component in any electronic circuit as known to those skilled in the art.

PMU 222 also has a periodic PMC 404, which may be a different PMC from PMC 402 (as illustrated) or may be the same PMC as PMC 402. Coupled to periodic PMC 404 is a PMC reset controller 406 that, after receiving a signal from a clock cycle counter 408a indicating that a predetermined period of time has elapsed, resets the counter in periodic PMC 404 (after periodic PMC 404 has sent its final count to a count comparator 410). Count comparator 410 compares the final count from periodic PMC 404 to a threshold value stored in count comparator 410. If the final count is outside the range of the threshold value, then count comparator 410 generates a first action signal, which prompts the execution of some configurable action. Details of the operation of PMU 222 are given below in FIG. 6a.

There are many types of configurable actions that can be performed in response to the first action signal. For example, a chip inhibit signal can be invoked to other logic on the chip (e.g., CPU), thus causing the chip (or a chiplet) to perform a specific action such as slowing down, speeding up, etc. The action signal may be used to generate a trigger signal for an external logic analyzer, thus starting or ending a capture of data by the logic analyzer. The action signal may be used to generate an internal trigger for use with an internal trace array, including a scan chain. This exemplary listing of configurable actions is not exhaustive, and thus any configurable action appropriate to the situation and known to those skilled in the art of circuitry design and modification may be prompted.

As configured according to FIG. 4a, PMU 222 is capable of determining, using only hardware, whether the measured/captured performance signals are higher or lower than expected (i.e., are above or below benchmark parameters). However, the user may also want to know if the number of instances in which the benchmark parameters are violated (performance signals are above or below benchmark parameters) during a predetermined amount of time are excessive. That is, not only may the fact that the number of performance signals exceeded (or didn't meet) a certain number within a certain amount of time be significant, but the number of times that a temporal group of signals were excessive (or insufficient) may also be significant. To register this second parameter, PMU 222 can be configured in the exemplary manner shown in FIG. 4b.

Figure 4B:
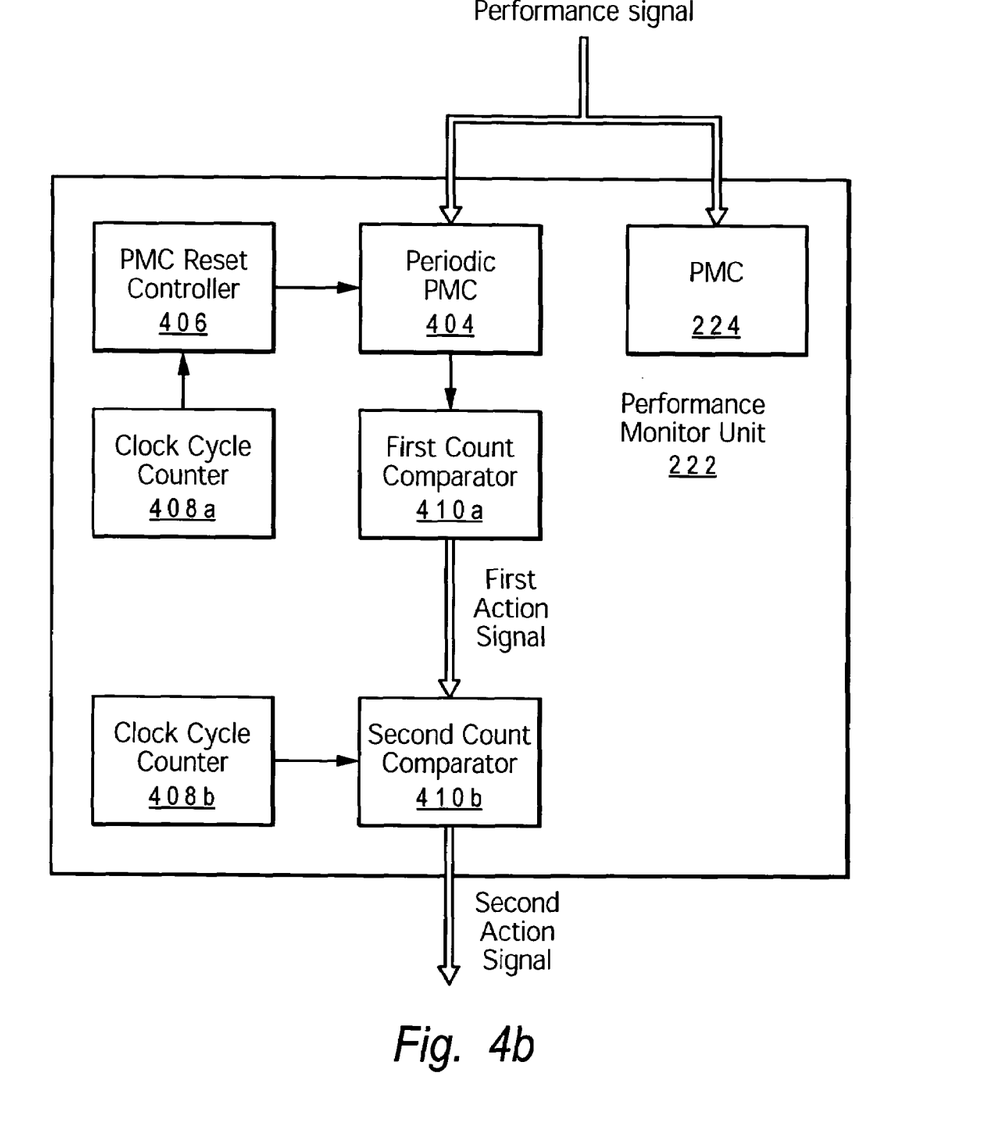
FIG. 4b is a schematic diagram illustrating the PMU having a second count comparator used to calculate a second derivative rate of change of system performance signals.

In FIG. 4b, PMU 222 has the same components as shown in FIG. 4a as well as a second clock cycle counter 408b and a second count comparator 410b. During a time period determined by clock cycle counter 408b, second count comparator 410b receives all first action signals generated from first count comparator 410a. The number of first action signals received, during the time period determined by clock cycle counter 408b, is compared to a predetermined value range stored in second counter comparator 410b. If the number of first action signals is less than or more than the predetermined value range stored in second count comparator 410b, then a second action signal is generated. The second action signal can evoke any configurable action, including those described above for the first action signal in FIG. 4a. Further details of steps taken using the circuit shown in FIG. 4b are described below in FIG. 6b.

While the circuit described in FIGS. 4a-b are efficient and require minimal additional hardware, there are occasions in which a history of performance signal generation is needed. That is, the circuit described in FIGS. 4a-b only is useful in giving an indication that parameters have been violated during some period of time, but that period of time can be at any time that the system is operating. There may occasions in which it is also desirable to know how long the system has been operating, at a fine granularity, before parameters are violated. For example, it may be significant to know that the only time that an I/O bus has a performance glitch is after the I/O bus has transmitted 40 GB of data since the computer booted up. Such detailed information is available through the use of circuitry described in FIGS. 5a-b.

Figure 5A:
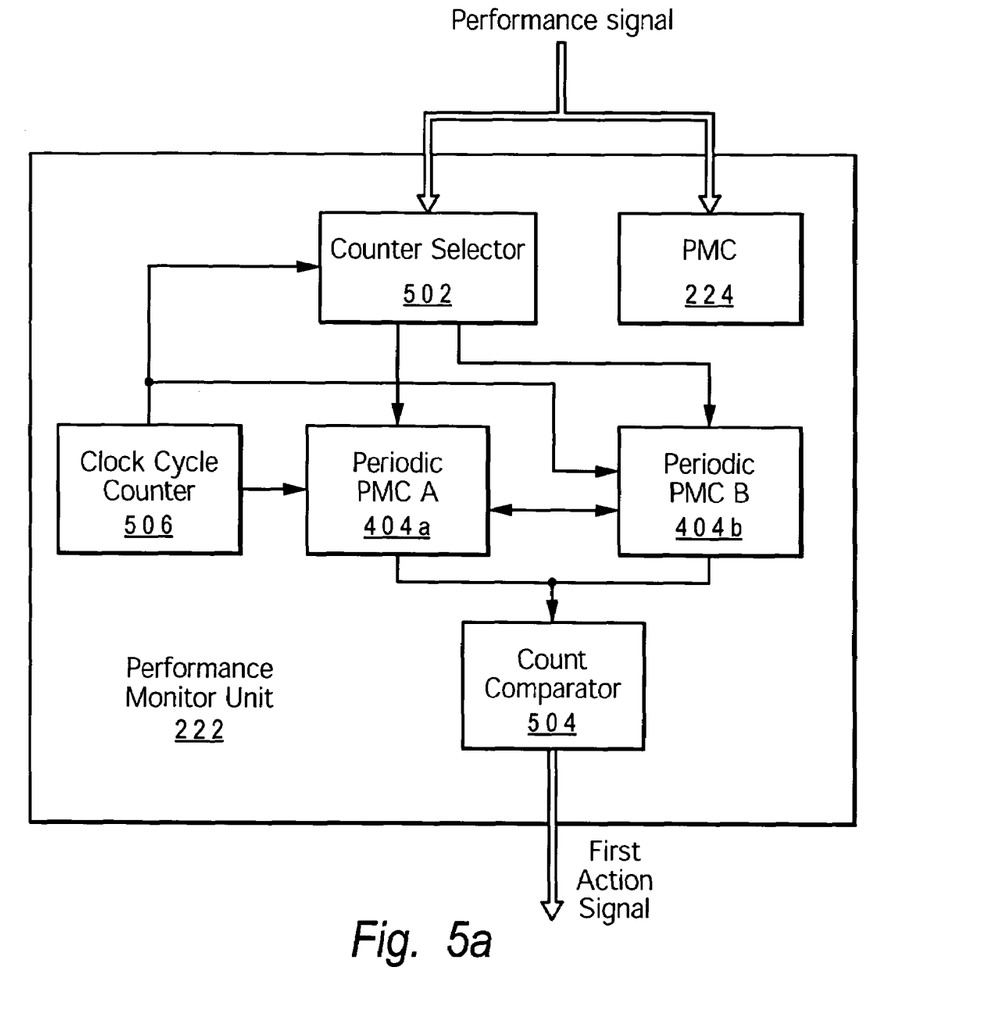
FIG. 5a is a schematic diagram of the PMU having multiple counters that enable a retrieval of immediate historical data for system performance signals.

With reference now to FIG. 5a, PMU 222 has a PMC 402 as described above in FIG. 4a. In addition, PMU 222 has a counter selector 502 coupled to periodic PMCs 404a and 404b. During a first time period controlled and determined by a clock cycle counter 506, all performance signals are directed by counter selector 502 to both periodic PMC 404a and periodic PMC 404b. During (an immediately subsequent) second time period, counter selector 502 sends all performance signals only to periodic PMC 404b. At the end of the second period of time, the contents of periodic PMCs 404a and 404b are sent to a count comparator 504. Count comparator 504 then determines the difference (delta) between the count in periodic PMC 504b and periodic PMC 504a using simple subtraction. The delta is then compared to a predetermined value range stored in count comparator 504. If the delta greater than (or optionally less than) the predetermined value range stored in count comparator 504, then count comparator generates a first action signal, which is the same as described above in FIGS. 4a-b.

After the end of the second time period, the count content of periodic PMC 404b is transferred to periodic PMC 404a, thus permitting both periodic PMC 404a and periodic PMC 404b to have a real-time current total performance signal count. Further details of the steps taken using the circuit shown in FIG. 5a are discussed below in FIG. 7a.

As discussed above in FIG. 4b, there are times in which knowing the second derivative (obtained by determining the rate of change of first action signals) of the performance signal count is useful. The exemplary circuit shown in FIG. 5b allows the calculation of this second derivative while retaining an immediate history of performance signals and first action signals. As in FIG. 5a, a running history of performance signals is maintained in periodic PMCs 404a and 404b, resulting in a first action signal from first count comparator 404a. The first action signals are then routed by a counter selector 502b to both periodic PMC 404c and periodic PMC 404d for a first time period by a clock cycle counter 402b. (Note that clock cycle counter 402b and clock cycle counter 402a may physically be the same circuitry, assuming of course that the circuitry has been configured to generate differently time signals to counter selector 502a, counter selector 502b, periodic PMC 404a, periodic PMC 404b, periodic PMC 404c, and periodic PMC 404d.)

Figure 5B:
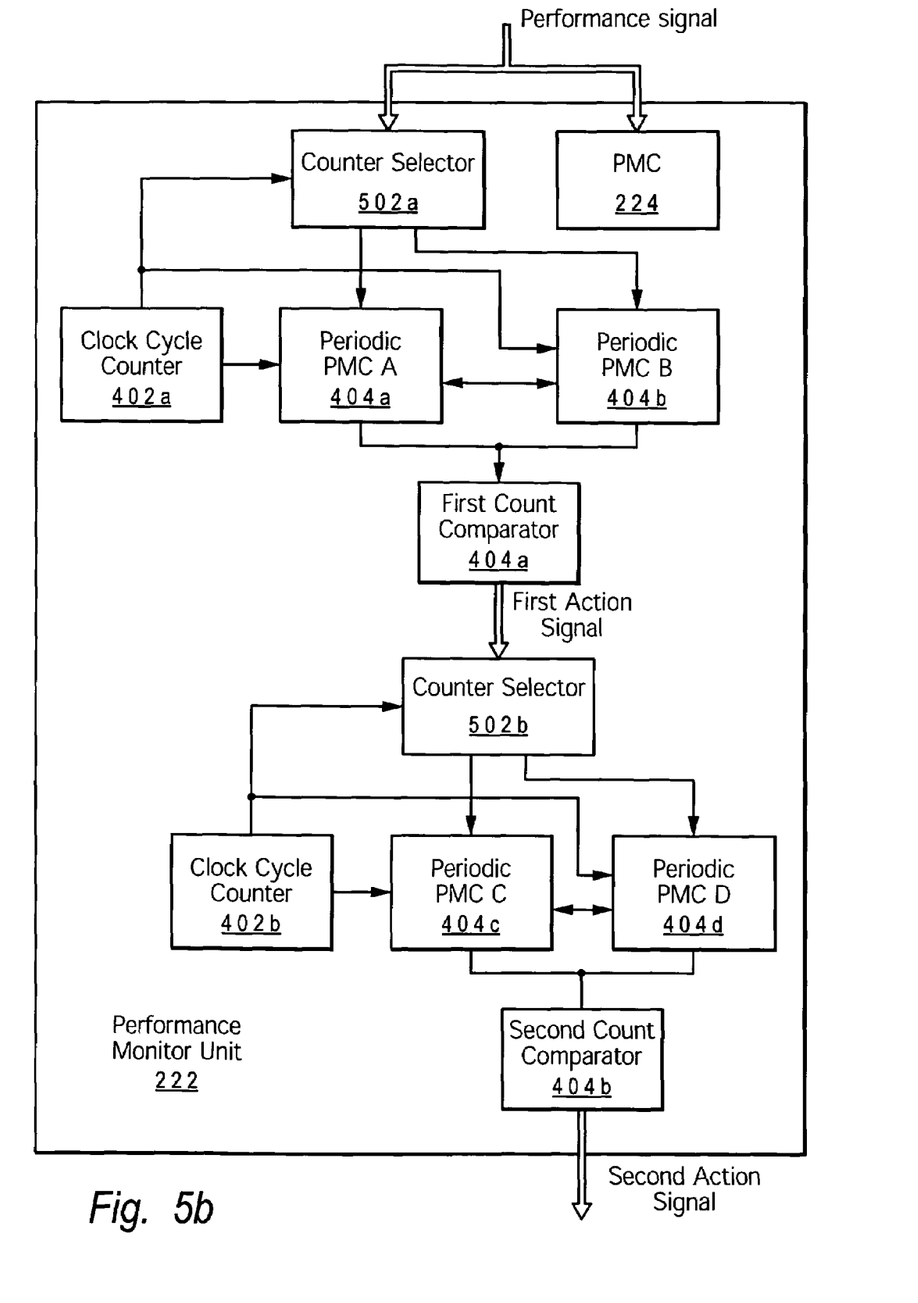
FIG. 5b is a schematic diagram similar to that shown in FIG. 5a, with the additional ability of calculating a second derivative rate of change of system performance signals.

During an immediately subsequent second time period, counter selector 502b routs the first action signals only to periodic PMC 404d. At the end of the second time period, second count comparator 404b computes the difference between the contents of periodic PMC 404c and periodic PMC 404d, and if that difference is outside a predetermined range, then second count comparator 404b evokes a second action signal. The second action signal can be used in an exemplary manner to initiate any configurable action, including those described above with reference to the first action signal.

Figure 6A:
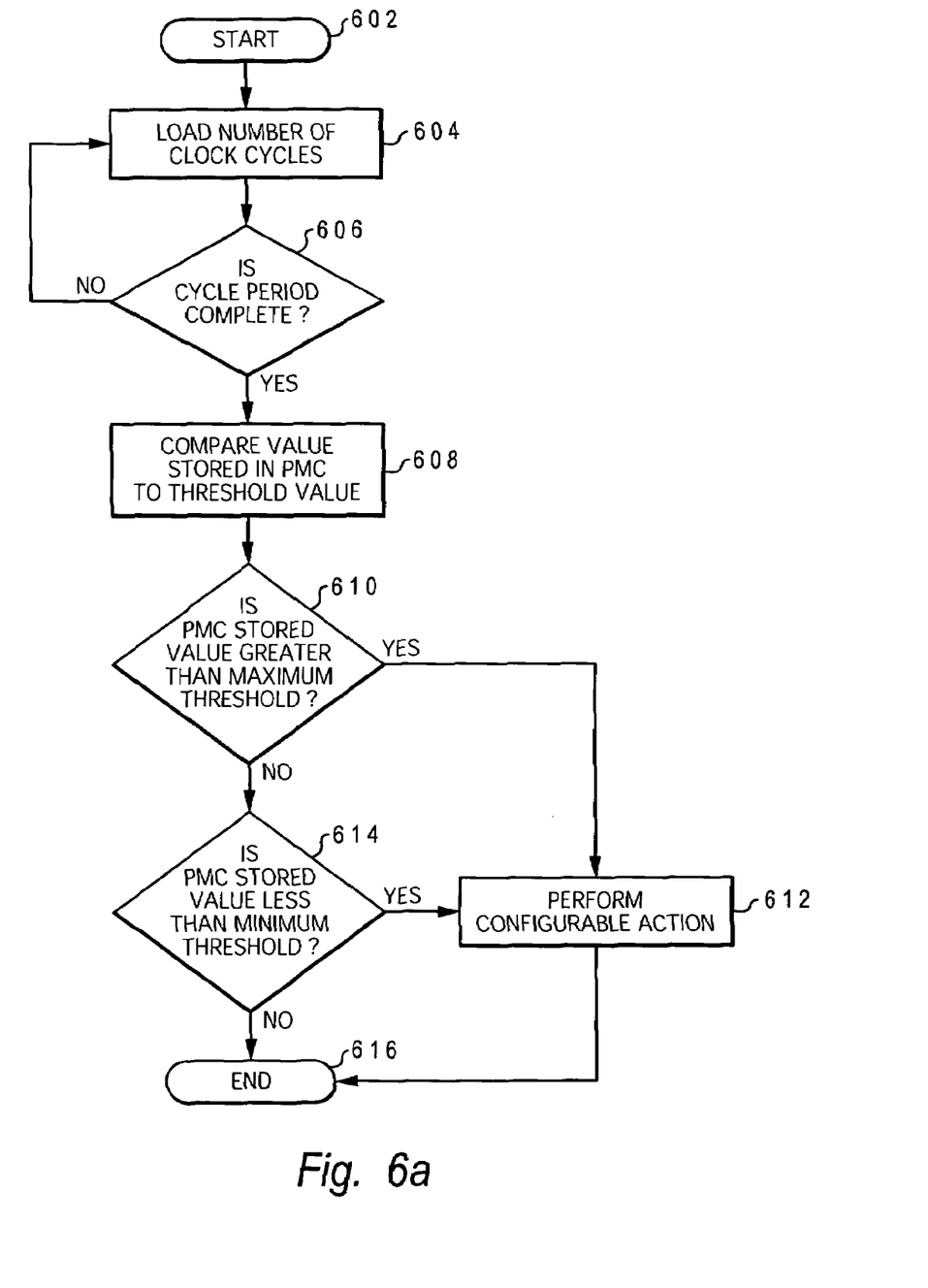
FIGS. 6a-b are flow charts of steps taken when using the hardware depicted in respective FIGS. 4a-b.

Referring now to FIG. 6a, a flow-chart of steps taken when using the circuitry shown in FIG. 4a is provided. After starting at initiator block 602, the clock cycle counter counts clock cycles (block 604). If a predetermined first time period is complete (query block 606), according to the clock cycle count in the clock cycle counter, then the performance signal count in the periodic PMC is sent to the count comparator (block 608). If the performance signal count stored in the periodic PMC is greater than a maximum threshold value (query block 610), then a configurable action is performed (block 612). If the performance signal count stored in the periodic PMC is not greater than a maximum threshold value but is less than a minimum threshold (query block 614), then some configurable action is likewise performed. Otherwise, the process ends (terminator block 616). As described in FIG. 4a, the configurable action may be any action deemed appropriate by the user of the system, including turning areas of the chip being tested off or on, generating external triggers for logic analyzers, generating internal trigger signals for scan operations, etc.

Figure 6B:
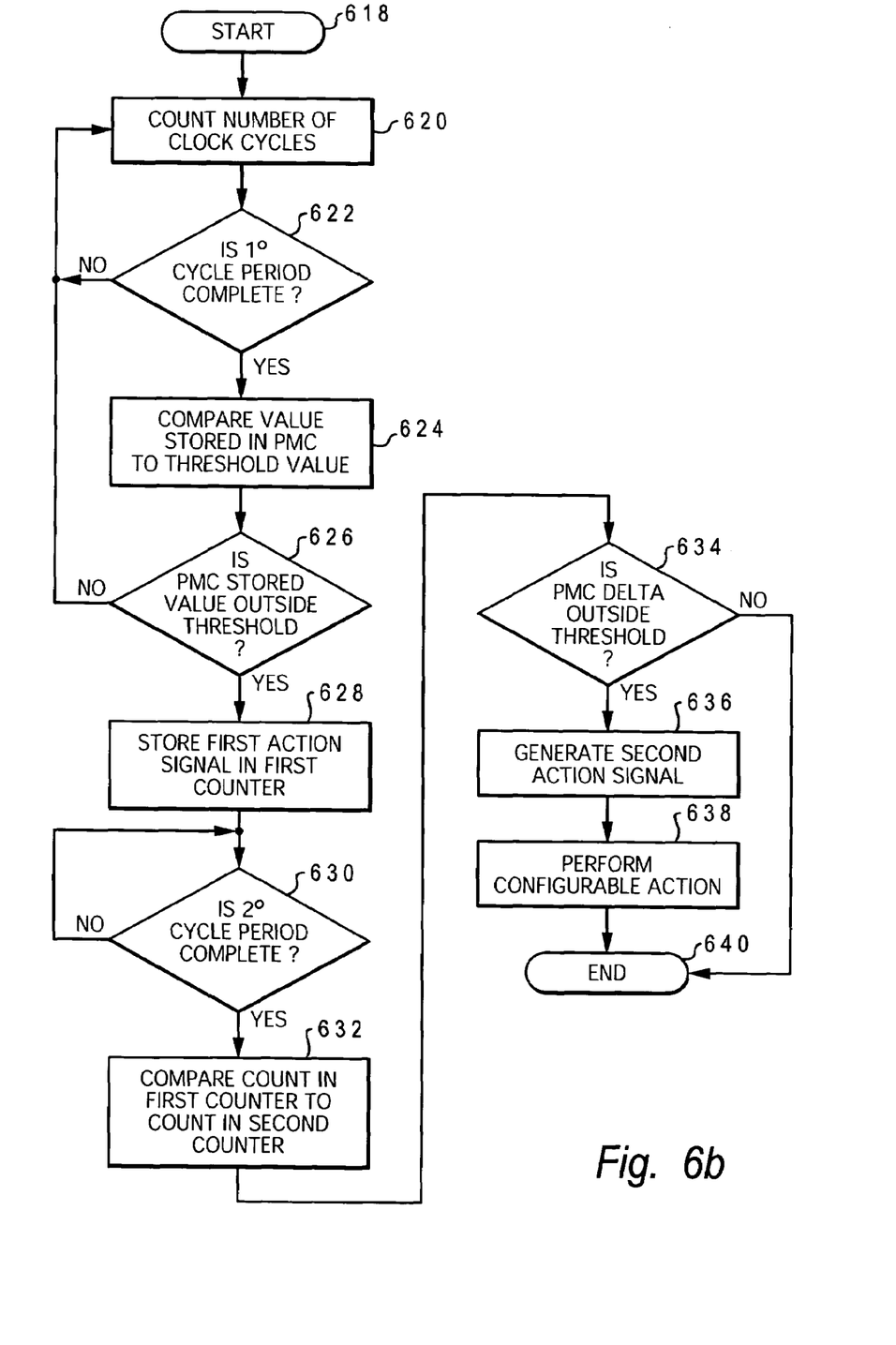

With reference now to FIG. 6b, a flowchart of steps taken when using the circuitry depicted in FIG. 4b is presented. After initiator block 618, the clock cycle counter 408a determines if the primary cycle period is completed (block 620 and query block 622), during which predetermined time performance signals are stored in periodic PMC 404. The periodic PMC 404 then sends the counted performance signals to first count comparator 410a, which determines if the number of performance signals stored during the primary time period are outside (higher or lower than) a predetermined parameter (block 624 and query block 626). If so, then a first action signal is evoked from first count comparator 410a and sent to second count comparator 410b (block 628). Clock cycle counter 408b determines if a secondary cycle period, which is a predetermined amount of time that first action signals are to be counted, is complete (query block 630). If so, then second count comparator 410b compares the number of stored first action signals with some predetermined number (block 632). If the number of first action signals exceeds that predetermined number (query block 634), then a second action signal is generated (block 636), and the process ends (terminator 638). (Again, note that first action signal and second action signal are each able to invoke any of the configurable actions described above.) By executing the steps shown in FIG. 6b, a determination is made not only of the first derivative of the number of performance signals (stored in the first count comparator as the frequency of performance signals received in a first predetermined period of time), but a determination is also made of the second derivative of the number of performance signals (stored in the second count comparator as the frequency of first action signals received in a second predetermined period of time.)

Figure 7A:
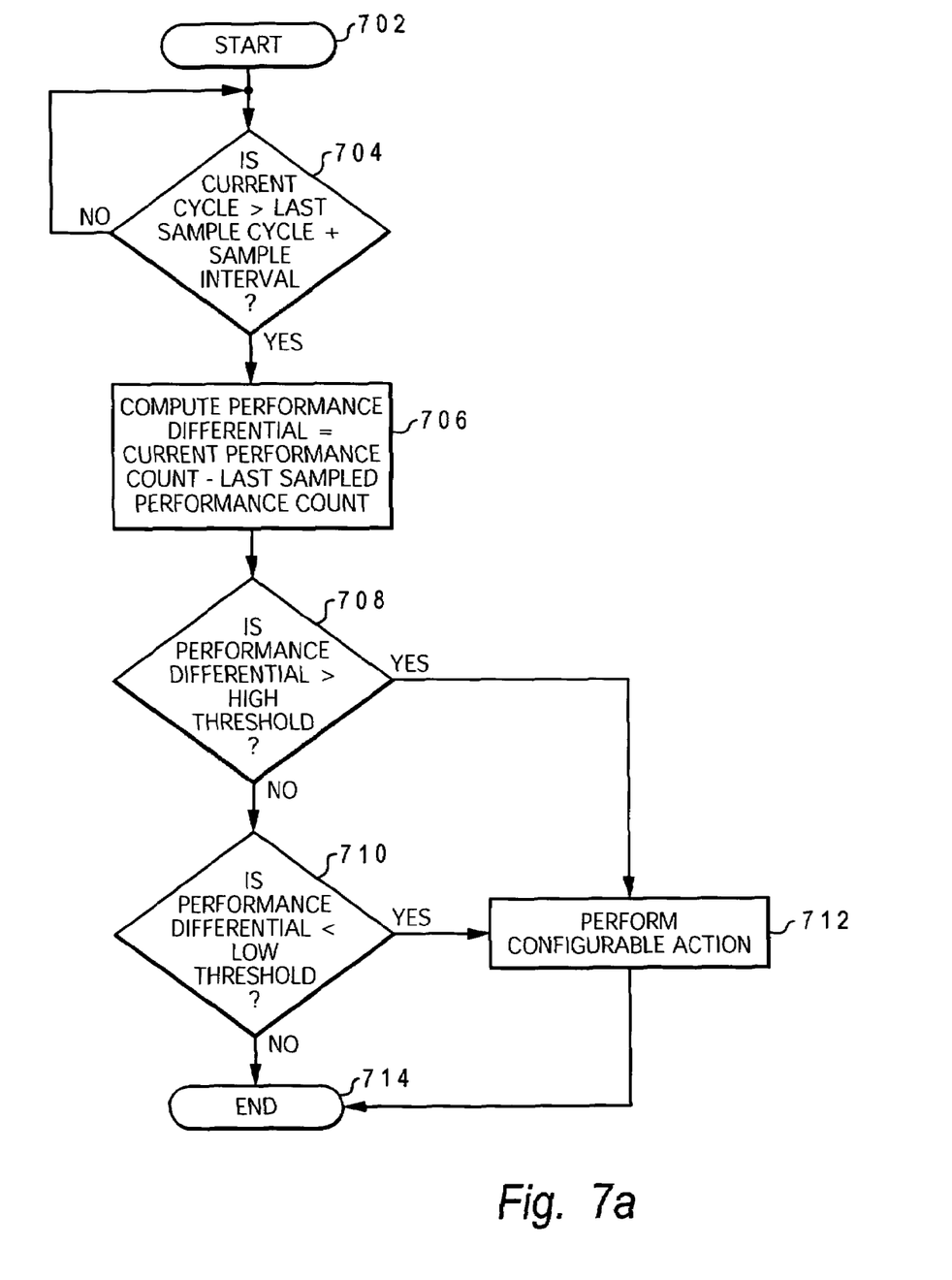
FIGS. 7a-b are flow charts of steps taken when using the hardware depicted in respective FIGS. 5a-b.

With reference now to FIG. 7a, exemplary steps are shown when using the circuit shown in FIG. 5a to calculate the first derivative of the number of performance signals while still retaining an overall performance signal count history. After initiator block 702, a query is made as to whether the current clock cycle total, stored in clock cycle counter 506, is greater than the last sample of clock cycles plus the predetermined clock cycle interval (number of cycles), as shown in query block 704. If so, then the performance (first) derivative is calculated by count comparator 504 by subtracting the last sample cycle's stored number of performance signals in periodic PMC 404a from the current total count of performance signals stored in periodic PMC 404b (block 706). If this derivative (delta) is above a predetermined high threshold (query block 708) or if the derivative is below a predetermined low threshold (query block 710), then a first action signal is generated to invoke a configurable action to be performed (block 710). If the threshold is not violated, then the process ends (terminator block 714). Note again that by always keeping a running total of total number of performance signals in one of the periodic PMCs 404 (preferably periodic PMC 404b as described above), a current history of the total number of performance signals is always available.

Figure 7B:
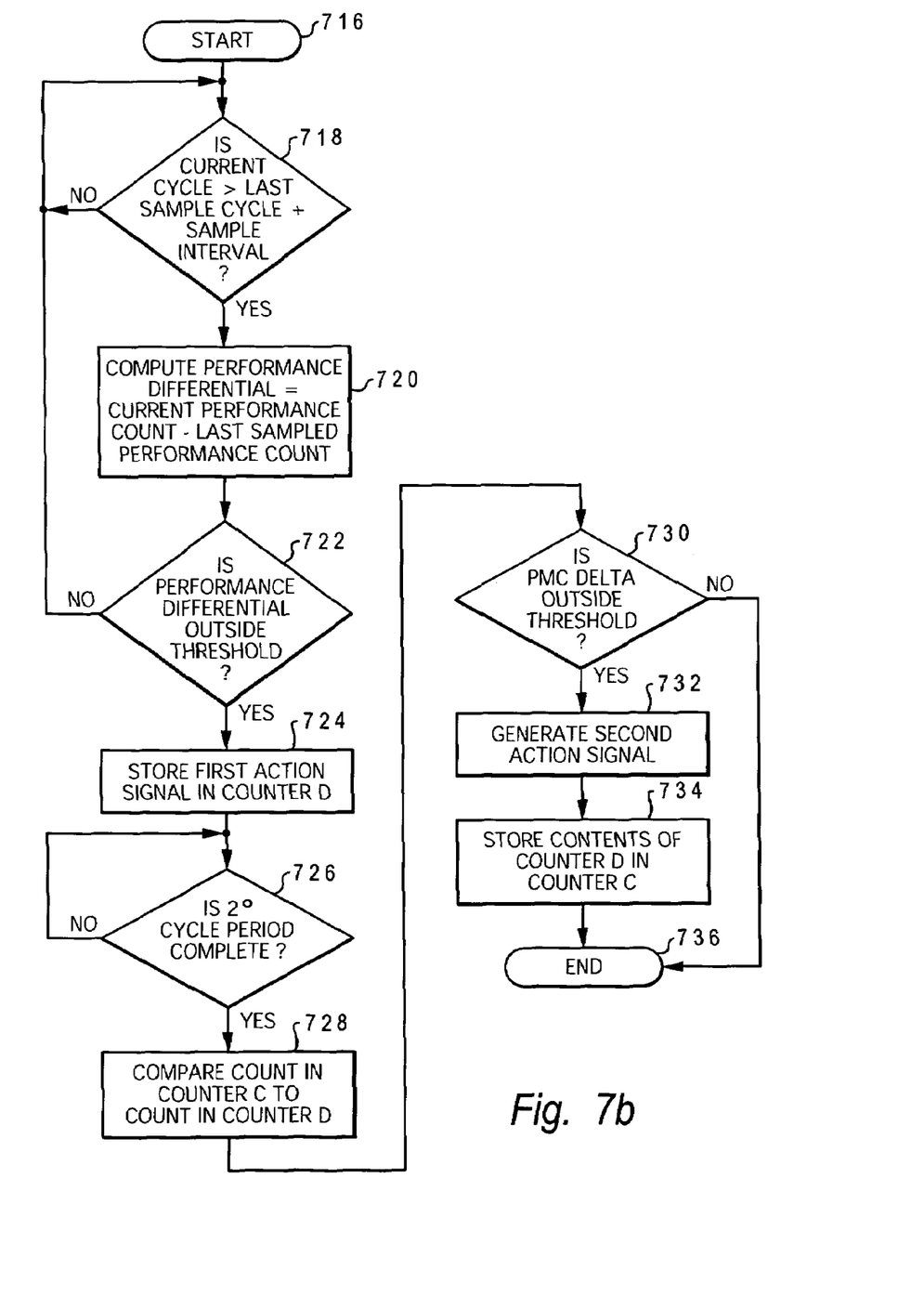

Referring now to FIG. 7b, exemplary steps are shown when using the circuit shown in FIG. 5b to calculate the second derivative of the number of performance signals while still retaining an overall performance signal count history. Steps 716 through 720 are analogous to steps 702 through 706 in FIG. 7a, and will not be re-discussed here. Query block 722 combines the steps in query blocks 708 and 712, resulting in a first action signal being sent, via counter selector 502b, to periodic PMC 404d (block 724). Assuming that periodic PMC 404c contains a count of first action signals stored during a previous period (as determined by clock cycle counter 402b) and that a predetermined secondary period (query block 726) for sampling first action signals is complete (as also determined by clock cycle counter 402b), the contents of periodic PMC 404c are compared to the contents of periodic PMC 404d (block 728). If the difference in the number of first action signals stored in periodic PMCs 404c and 404d are outside (above or below) a predetermined threshold for first action signals (query block 730), then second count comparator 404b generates a second action signal (block 732), which may be used (optionally) to initiate a configurable action such as those described above in FIG. 4a. As with the periodic PMCs 404a and 404b that maintain a running total of performance signals, periodic PMC 404d stores its contents in periodic PMC 404c (block 734), so that a running total of first action signals can be maintained in periodic PMC 404c for future comparisons with the contents of periodic PMC 404d. The process thus ends at terminator block 736.

The present invention has been described in relation to particular embodiments which are intended in all respects to be illustrative rather than restrictive. Alternative embodiments will become apparent to those skilled in the art to which the present invention pertains without departing from its spirit and scope. For example, while the present invention has been described in an exemplary manner as being applied to a microprocessor, the concepts and features described herein may be used in any hardware system having performance metrics, preferably those hardware systems that use performance monitor counters. Similarly, the present invention as described may be used to debug hardware problems in any appropriate hardware that generates performance signals. Accordingly, the scope of the present invention is defined by the appended claims rather than the foregoing discussion.

What is claimed is:

1. A circuit comprising:
   a periodic Performance Monitor Counter (PMC), the periodic PMC being configured to count performance signals from a component of a computer system for a predetermined period of time; and
   a first count comparator hardware coupled to the periodic PMC, wherein in response to the first count comparator hardware determining that the number of performance signals stored in the periodic PMC is outside of a first predetermined range of numbers, the first count comparator hardware generates a first action signal to evoke a performance adjustment to a computer logic whose performance signals are being monitored by the periodic PMC.

2. The circuit of claim 1, further comprising:
   a PMC reset controller, wherein the PMC reset controller clears the periodic PMC after the predetermined period of time.

3. The circuit of claim 1, further comprising:
   a counter selector coupled to the first count comparator hardware;
   a first counter and a second counter coupled to the counter selector, wherein the counter selector is capable of selectively toggling between the first and second counters to store a current first action signal count stored in the periodic PMC, such that one of the first and second counters stores a previous period's first action signal count from the first count comparator hardware and the other of the first and second counters stores a current period's first action signal count from the first count comparator hardware; and a second count comparator coupled to the first and second counters, wherein the second count comparator issues an action signal in response to a difference between the performance signal counts in the first and second counters being outside of a second predetermined range of numbers.

4. The circuit of claim 1, wherein the computer system is a microprocessor.

5. The circuit of claim 1, wherein the action signal is an external trigger used to control an event capture by a logic analyzer that is external to the computer system.

6. The circuit of claim 1, wherein the action signal generates an internal trigger for use with an internal trace array.

7. The circuit of claim 1, wherein the action signal generates a new performance event that is stored in a performance event PMC, wherein the performance event PMC stores a total number of action signals that reflect the number of times that the performance signals exceed the first predetermined range of numbers.

8. A circuit comprising:
   a periodic Performance Monitor Counter (PMC), the periodic PMC being configured to count performance signals from a component of a computer system;
   a counter selector coupled to the periodic PMC;
   a first counter and a second counter coupled to the counter selector, wherein the counter selector is capable of selectively toggling between the first and second counters to store a current performance signal count stored in the periodic PMC, such that one of the first and second counters stores a previous period's performance signal count from the periodic PMC and the other of the first and second counters stores a current period's performance signal count from the periodic PMC; and a count comparator coupled to the first and second counters, wherein the count comparator issues an action signal in response to a difference between the performance signal counts in the first and second counters being outside of a predetermined range of numbers.

9. The circuit of claim 8, further comprising:
a clock cycle counter coupled to the count comparator, wherein the clock cycle counter controls when the performance signal counts in the first and second counters are compared.

10. The circuit of claim 8, wherein the computer system is a microprocessor and wherein the action signal causes a chiplet in the microprocessor to perform a specific action.

11. The circuit of claim 8, wherein the action signal is an external trigger used to control an event capture by a logic analyzer that is external to the computer system.

12. The circuit of claim 8, wherein the action signal generates an internal trigger for use with an internal trace array.

13. The circuit of claim 8, wherein the action signal generates a new performance event that is stored in a performance event PMC, wherein the performance event PMC stores a total number of action signals that reflect the number of times that the performance signals exceed the predetermined range of numbers.

14. A method for capturing a change in performance in a computer logic using a Performance Monitoring Counter (PMC), the method comprising:
storing in a first hardware counter a starting count of performance events captured by a PMC;
storing in a second hardware counter an ending count of performance events captured by the PMC;
comparing the counts of performance events in the first and second hardware counters; and
generating an action signal if a first derivative of the performance event counts in the first and second hardware counters is outside a first predetermined range of values.

15. The method of claim 14, further comprising:
storing the first derivative of the performance event counts in the first and second hardware registers in a third hardware counter;
storing a subsequent first derivative of the performance event counts in the first and second hardware counters in a fourth hardware counter; and
in response to a second derivative of the first derivative and the subsequent first derivative being outside of a second predetermined range of values, generating the action signal.

16. A method comprising:
storing in a first hardware counter a starting count of performance events captured by a Performance Monitoring Counter (PMC);
storing in a second hardware counter an ending count of performance events captured by the PMC;
comparing the counts of performance events in the first and second hardware counters;
using hardware to calculate a first derivative that reflects a rate of change in performance events;
deriving the first derivative to obtain a second derivative that reflects a delta in the rate of change in performance events; and
generating an action signal if the first derivative of the performance event counts in the first and second hardware counters is outside a first predetermined range of values.

17. The method of claim 16, further comprising: using the second derivative to prompt a configurable action.

18. The method of claim 17, wherein the configurable action is a chip inhibit.

19. The method of claim 17, wherein the configurable action is a trigger for a logic analyzer.

* * * * *